No. 662,776. Patented Nov. 27, 1900.
E. B. DIXON.
SEED PLANTER.
(Application filed June 1, 1900.)
(No Model.) 6 Sheets—Sheet 1.
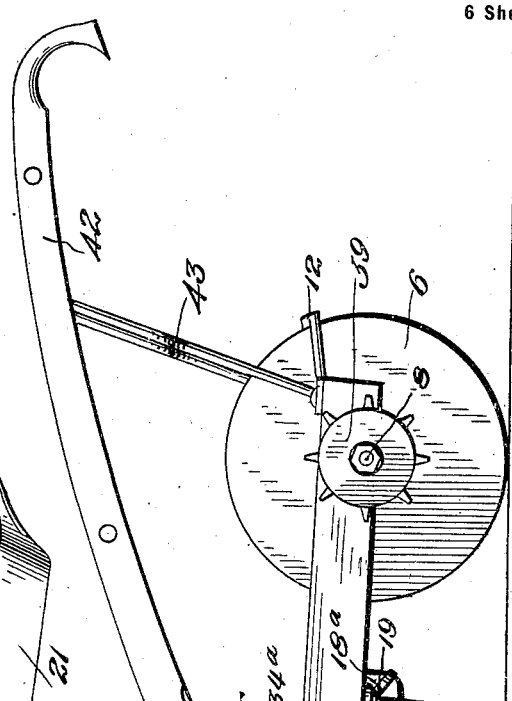
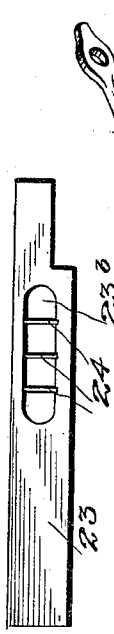
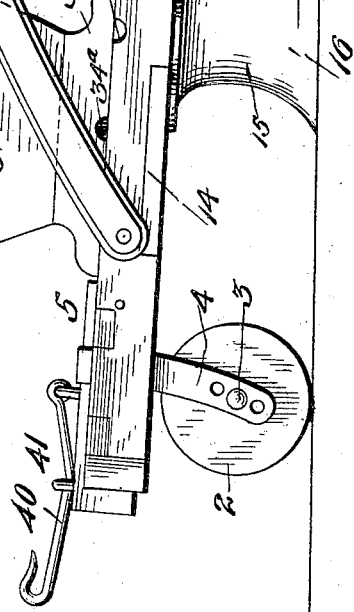
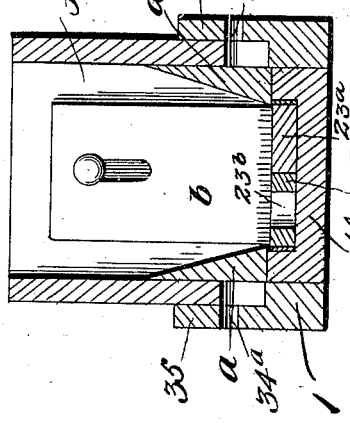
Witnesses
C. E. Hunt
H. B. Wilson
Inventor
E. B. Dixon
by H. B. Wilson & Co.
Attorneys
THE NORRIS PETERS CO., PHOTO-LITHO., WASHINGTON, D. C.

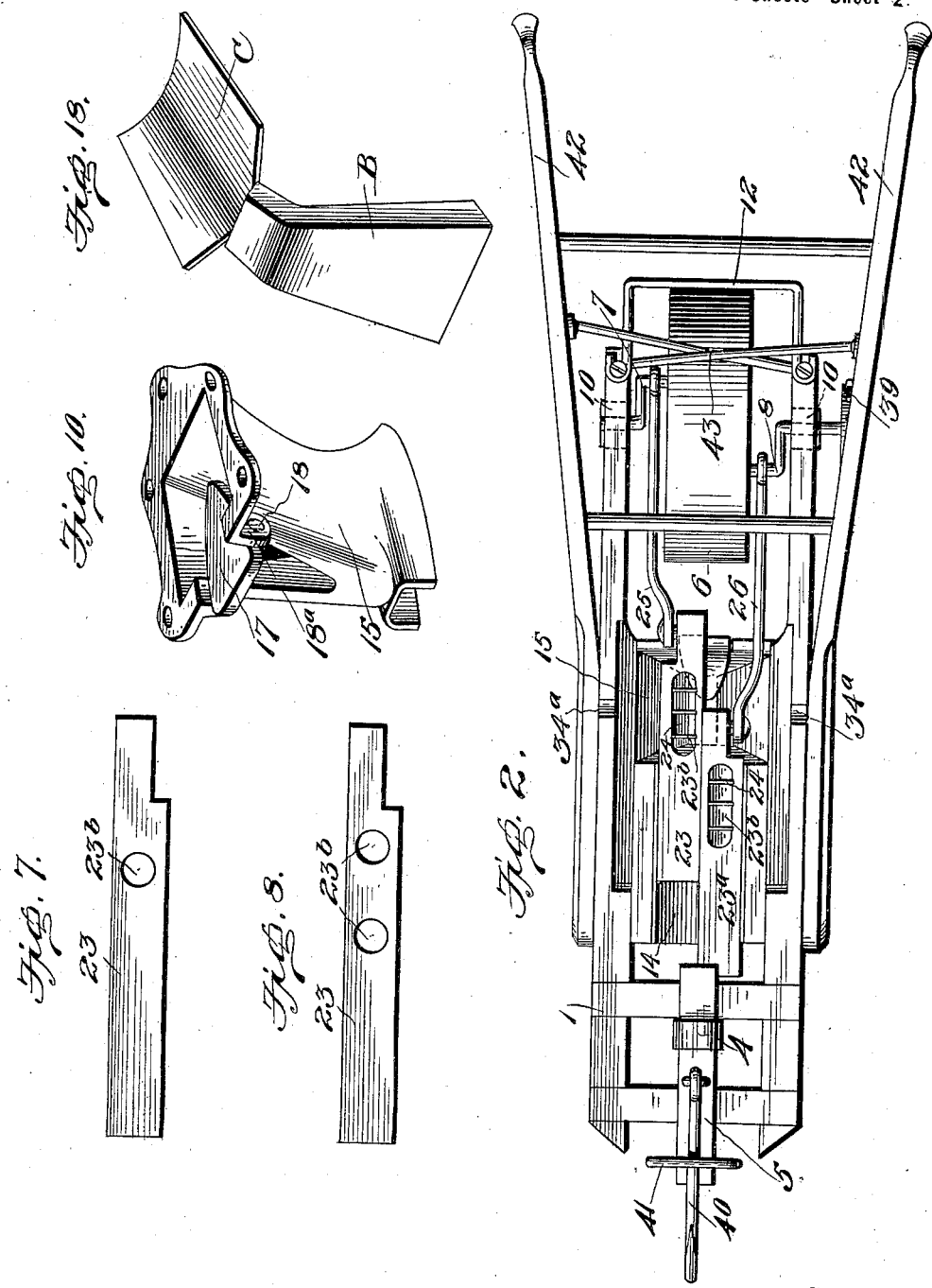

No. 662,776. Patented Nov. 27, 1900.
E. B. DIXON.
SEED PLANTER.
(Application filed June 1, 1900.)
(No Model.) 6 Sheets—Sheet 3.
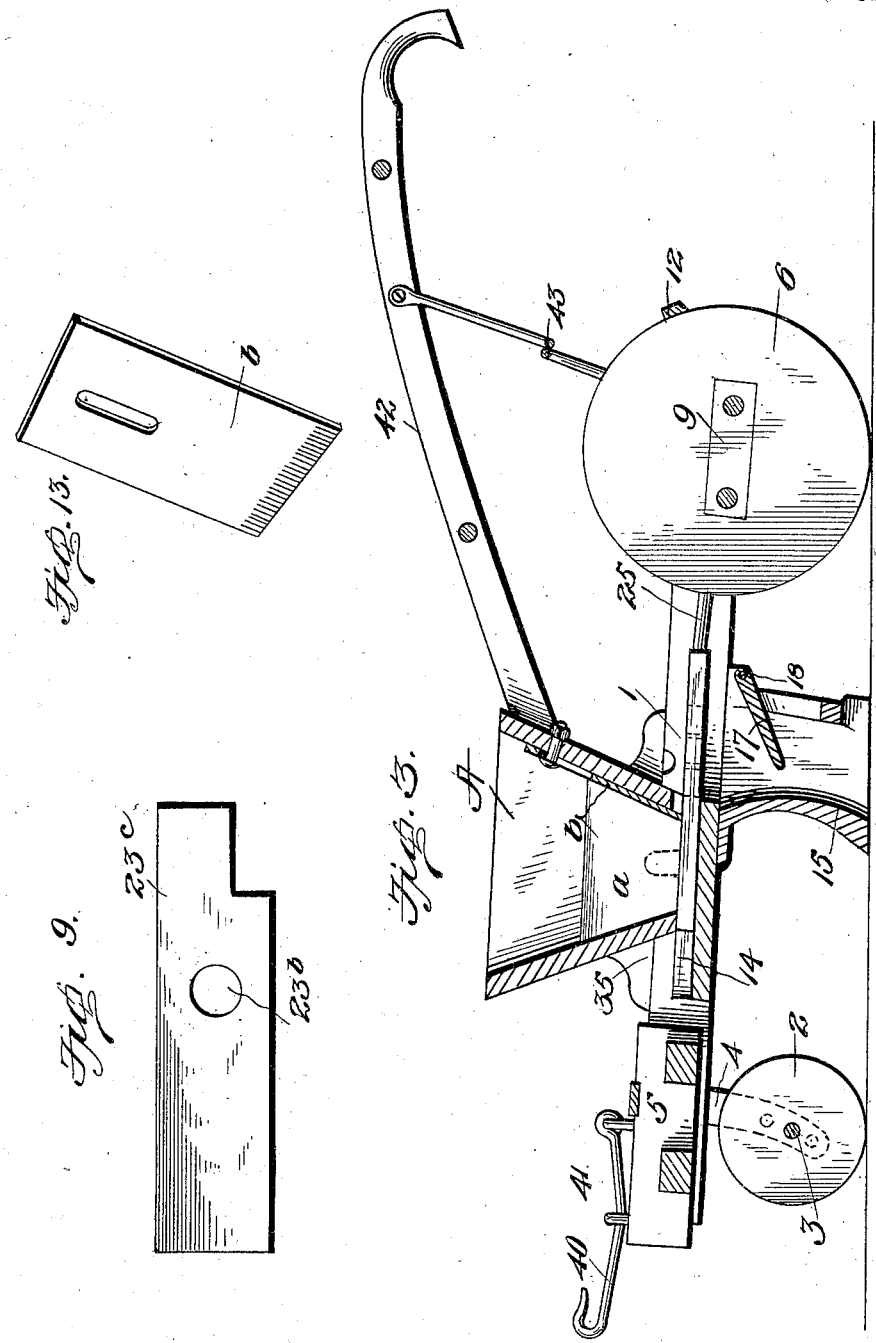
Witnesses
Inventor
E. B. Dixon
by H. B. Willson & Co
Attorneys No. 662,776. Patented Nov. 27, 1900.
E. B. DIXON.
SEED PLANTER.
(Application filed June 1, 1900.)
(No Model.) 6 Sheets—Sheet 4.
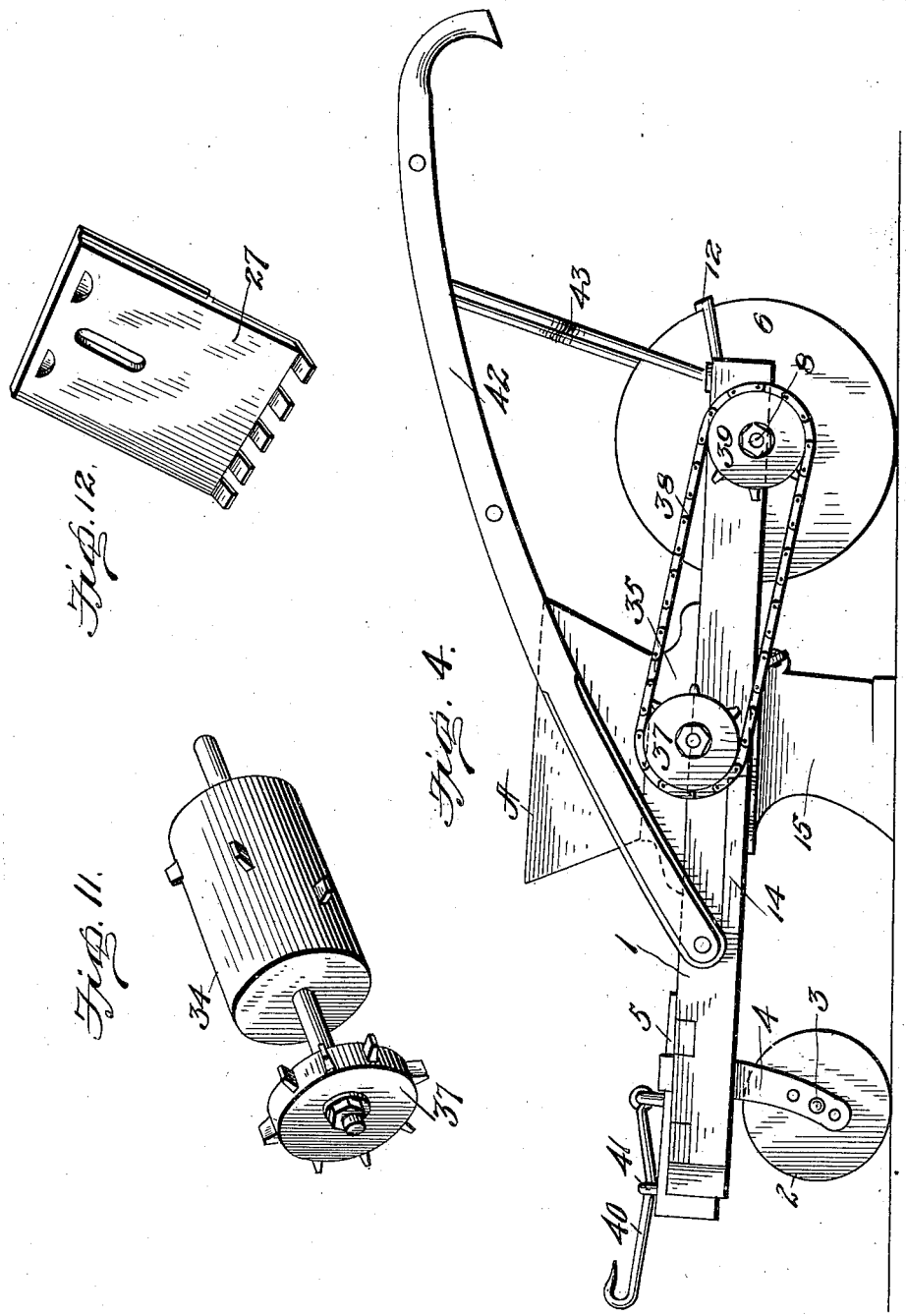
Witnesses
Inventor
E. B. Dixon
Attorneys

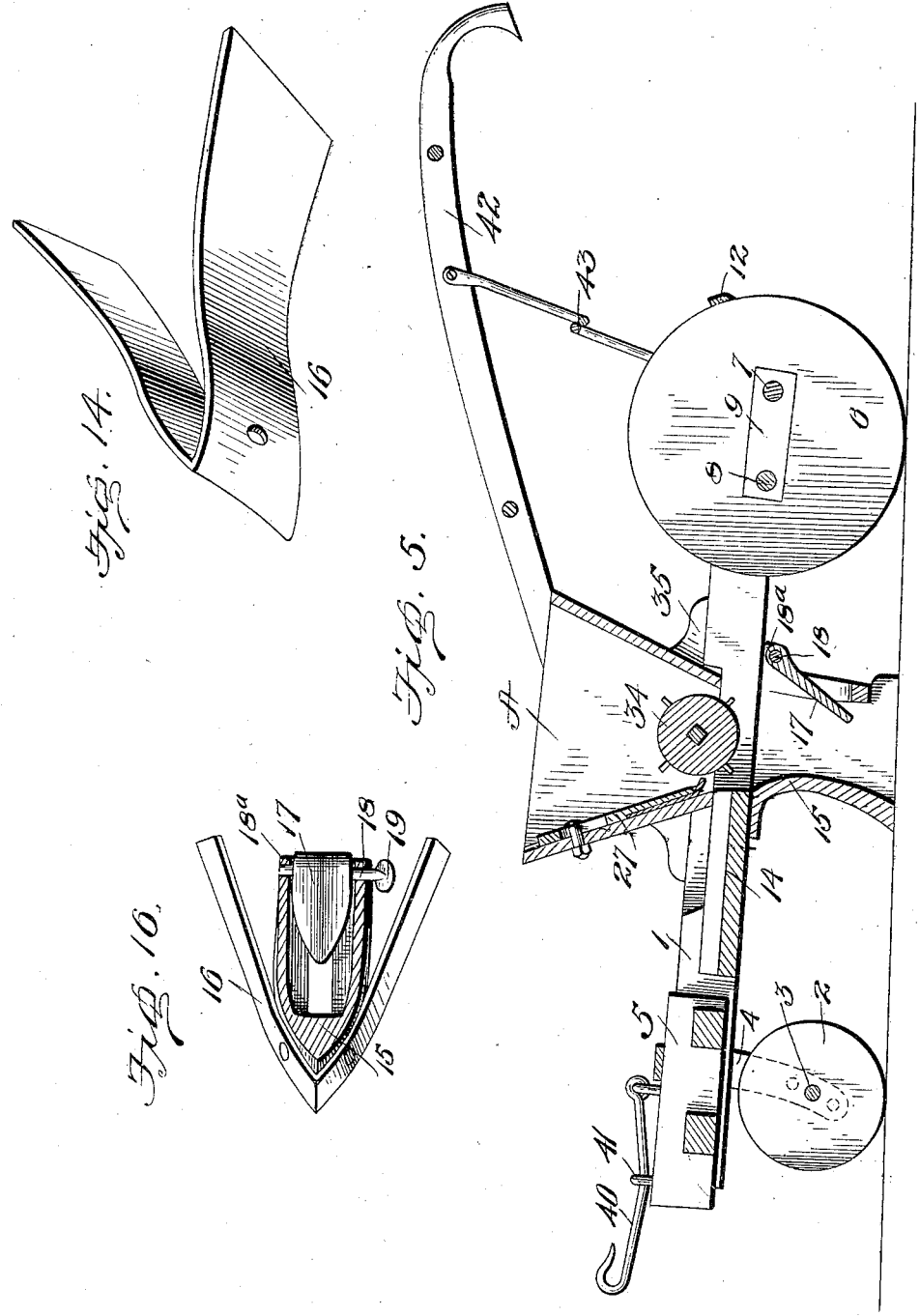

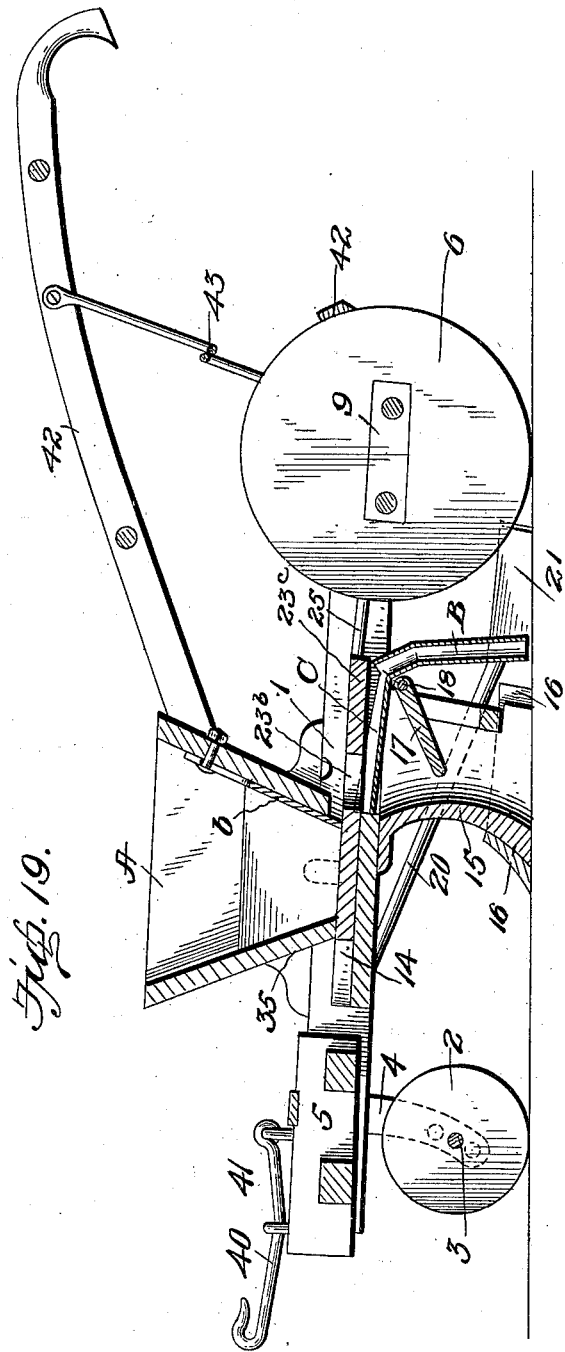

UNITED STATES PATENT OFFICE.

EDWARD B. DIXON, OF GRANTSBOROUGH, NORTH CAROLINA.

SEED-PLANTER.

SPECIFICATION forming part of Letters Patent No. 662,776, dated November 27, 1900.

Application filed June 1, 1900. Serial No. 18,783. (No model.)

*To all whom it may concern:*

Be it known that I, EDWARD B. DIXON, a citizen of the United States, residing at Grantsborough, in the county of Pamlico and State of North Carolina, have invented certain new and useful Improvements in Seed-Planters; and I do declare the following to be a full, clear, and exact description of the invention, such as will enable others skilled in the art to which it appertains to make and use the same.

My invention relates to convertible seed-planters for planting corn, peas, or cotton; and it consists in the construction and novel combination of the parts of the machine, as hereinafter fully described and claimed.

In the drawings hereto annexed and forming part of this specification, Figure 1 is a side elevation of my improved planter arranged for planting corn. Fig. 2 is a plan view of the same with the seed-hopper removed, showing arrangement of double seed-slides for dropping corn, peas, and the like. Fig. 3 is a vertical longitudinal section of the planter arranged as in Fig. 1. Fig. 4 is a side elevation showing the planter arranged for planting cotton. Fig. 5 is a vertical longitudinal section of Fig. 4. Fig. 6 is a detail plan view of one of the seed-slides used in planting corn, peas, or the like. Fig. 7 is a similar view of a different form of seed-slide. Fig. 8 is a similar view of another form of seed-slide. Fig. 9 is a similar view of still another form of seed-slide. Fig. 10 is a detail view of the seed-discharge tube, showing the position of the pallet used to scatter the seed. Fig. 11 is a detail view in perspective of the toothed feed-cylinder used in connection with the machine when planting cotton-seed. Fig. 12 is a detail view of the feed-gage slide used in the seed-hopper when planting cotton-seed. Fig. 13 is a detail view in perspective of the feed-gage slide or brush used in the seed-hopper when the planter is used in planting corn. Fig. 14 is a similar view of the opening-plow or spreader. Fig. 15 is a detail view of one of the seed-covering shoes removed. Fig. 16 is a horizontal sectional detail view taken through the seed-discharge tube, showing the seed-scatterer in plan view and showing also the opening-plow or spreader secured at the lower end of said seed-discharge tube. Fig. 17 is a transverse vertical sectional view through the hopper arranged for planting corn or peas, and Fig. 18 is a detail perspective view of the detachable seed-spout B. Fig. 19 is a vertical longitudinal section of the planter arranged for planting truck-peas.

Referring by characters to the accompanying drawings, 1 designates the main frame of the planter, which frame is provided near its front end with a guide-wheel 2, the shaft 3 of which is adjustable vertically in seats in a depending fork 4, fixed to the draft-beam 5 at the front end of the machine-frame. Near its rear end the main frame 1 is provided with the drive-wheel 6, which has a broad peripheral surface or tread which serves to pack the loose soil on the seed over which it passes when in use.

The driving-wheel 6, instead of being fixed to or mounted upon a centrally-disposed shaft or axle supported, as usual, in bearings or boxes in the main frame, is in this instance supported upon oppositely-projecting crank-shafts 7 and 8, secured within said wheel 6 at the opposite ends of parallel wear strips or plates 9, let into seats or recesses in the parallel faces of said wheel 6. At their outer ends said crank-shafts 7 and 8 are journaled in boxes 10, secured to the lower faces of the side rails of the main frame near the rear ends of said side rails. A scraper 12 is secured to the rear end of the main frame and serves to keep the periphery of the wheel 6 clear or free from adhering soil.

14 is a transversely-disposed seed-slide-supporting plate which is secured between the parallel side beams of the main frame, between the guide-wheel and the drive-wheel, and is provided at its rear edge with a depending seed discharge or tube 15, provided at its lower end with a detachable opening and dirt-spreading plow or share 16. The lower end of the seed-discharge is made in shoe form, open at the heel to permit the escape of the soil, and thereby prevent clogging of the shoe. In its upper portion, at the rear side thereof, the seed discharge or tube 15 is provided with a hinged pallet or scatter-plate 17, which is supported on a rock-shaft 18, journaled transversely of the discharge or tube 15 in bearing-lugs 18$^a$, and provided also on its projecting end with a finger-piece 19 to permit the scatter-plate 17 to be adjusted to cause the scattering of the seed to be greater or less, as may be desired, and by turning the scatter-plate to a horizontal position the seed will be drilled into the ground.

The supporting-plate 14 for the seed-slides and seed-hopper is recessed in its upper face for the reception of the seed-slides 23 23$^a$ or the single seed-slide 23$^c$, as the case may be, and each of said seed-slides is provided with an open-bottom seed pocket or orifice 23$^b$. In some instances the open-bottom seed pocket or orifice is elongated or enlarged and separated by vertical partitions 24 into several compartments, so that the seed may be separated and not dropped all at one time, such construction being illustrated in Fig. 6 of the drawings. Fig. 7 shows one of a pair of slides each of which has but one circular pocket. Fig. 8 shows one of a pair each of which has two circular pockets, and Fig. 9 shows the form of a single slide having but one pocket. These different arrangements of slides provide for dropping seeds at greater or less distances apart, as desired.

The seed-slides 23 23$^a$ are connected at their rear ends by pitman-rods 25 26 with the inner portions of the crank-shafts 7 and 8, so that where two slides are used they are reciprocated when the driving-wheel revolves. Where a single slide 23$^c$ is used, but a single pitman-rod, either the rod 25 or the rod 26, is used to operate the single seed-slide.

Mounted upon the main frame of the planter is the adjustable or movable seed-hopper A. The said hopper when being used for planting grain, peas, and the like is provided upon its inner lower side walls with deflectors $a$ $a$, which consist of inwardly-converging removable guide-boards, which cause the seed to feed directly to the pockets in the slides. The hopper when used in this connection is also provided upon its rear wall with an adjustable flexible slide or brush $b$, (preferably formed of leather,) which is held in adjustment by means of a set-screw or bolt working through a vertical slot in said slide. This slide regulates the amount of seed fed to the pockets in the seed-slides. The hopper when used as above described is mounted forward of the seed-discharge tube and directly over the seed-slide-supporting plate 14.

When the machine is used to plant cotton-seed, the seed-slides are entirely removed and the hopper is moved backward upon the supporting-frame until the mouth of said hopper is directly over the seed-discharge tube. The deflector-boards $a$ $a$ and the brush $b$ are now removed from the hopper and in place thereof is inserted a toothed cylinder 34, the journals of which are mounted in bearings 34$^a$, formed in the side rails of the main frame, and the contiguous edges of the side bars 35 secured to the sides of the hopper, as shown. The hopper when used for cotton-seed is further provided on the inner side of its front wall with a vertically-adjustable feed slide or regulator 27, which is held in its adjusted position by a set-screw or bolt working through a slot. This slide has upon its lower edge a series of teeth spaced equidistant from each other and projecting downwardly and inwardly to the periphery of the toothed cylinder 34, the teeth upon said cylinder being arranged spirally around the same and so spaced that upon the rotation of said cylinder they will consecutively pass between the teeth upon the slide 27, thereby forcing the cotton-seed from the hopper to the discharge-tube in a positive and regular manner. One of the journals of the toothed cylinder 34 projects beyond the sides of the frame and is provided with a sprocket-wheel 37, which is connected by a sprocket-chain 38 to a similar sprocket-wheel 39, fixed upon the projecting end of the crank-shaft 8, so that as the machine is moved forward motion is imparted from the drive-wheel to the toothed cylinder through the medium of the sprocket wheel and chain just described, causing the same to rotate and feed the cotton-seed to the discharge-tube below.

When using the planter for sowing truck-peas or seed where it is desirable that they should be spread in furrows three or four inches in width, I provide a detachable flat metal spout B, being narrow at its upper end and flaring toward its lower end or mouth and having attached to its upper end a forwardly-projecting slightly convex and rearwardly-inclined metal apron C, which rests upon the top of the seed-discharge tube, thereby closing the upper end of said tube, and upon which will drop the seed from the open pockets of the seed-slides, and by reason of the inclination of said apron C the seed will be conducted into the spout B, through which they will be conducted and scattered in the wide furrow made by the detachable spreader 16, which is only used in connection with the spout B or when planting seed which need to be sowed in a broad furrow. In this connection I also employ removable seed-covering blades or drags secured by arms 20 to the frame of the machine, said arms extending rearwardly and being provided at their rear ends with inclined inwardly-converging blades or scrapers 21, which cover the scattered seed.

For ordinary seed-planting the rear drive-wheel is depended on for covering the seed. The front guide-wheel is raised or lowered to vary the depth to which it is desired to plant seed.

A draft-hook 40 is attached to the central or draft beam at the front of the main frame and is passed through a guide-loop 41, rigidly attached to the upper face of said draft-beam near its front end. Suitable handles 42 are connected at their front ends to the side rails of the main frame and are connected with the rear ends of said side rails by suitably curved and crossed brace-rods 43, extending above the driving and packing wheel 6.

Various changes in the form, proportion, and the minor details of construction may be resorted to without departing from the principle or sacrificing any of the advantages of this invention.

Having thus fully described my invention, what I claim, and desire to secure by Letters Patent, is—

1. In a seed-planter, the combination with the main frame, of a seed-hopper, a seed-discharge tube, a scatter-plate mounted in said discharge-tube and capable of adjustment, an interchangeable seed-spout provided with an apron to project over the upper end of said seed-discharge tube, and means for feeding the seed from said hopper to said discharge-spout, substantially as set forth.

2. In a seed-planter, the combination with the main frame, of a seed-hopper, a seed-discharge tube provided at its lower end with a plow, an interchangeable seed-spout provided with an apron to project over and close the upper end of the seed-discharge tube, and means for feeding the seed from the hopper to the seed-discharge spout, substantially as set forth.

In testimony whereof I have hereunto set my hand in presence of two subscribing witnesses.

EDWARD B. DIXON.

Witnesses:
  GEO. DEES,
  JOSIAH TINGLE.